(12) United States Patent
Wang et al.

(10) Patent No.: US 9,385,598 B2
(45) Date of Patent: Jul. 5, 2016

(54) BOOST CONVERTER STAGE SWITCH CONTROLLER

(71) Applicant: KONINKLIJKE PHILIPS N.V., Eindhoven (NL)

(72) Inventors: Kan Wang, Austin, TX (US); Michael A. Kost, Austin, TX (US); Eric J. King, Dripping Springs, TX (US); John L. Melanson, Austin, TX (US); James P. McFarland, Austin, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 257 days.

(21) Appl. No.: 14/303,068

(22) Filed: Jun. 12, 2014

(65) Prior Publication Data

US 2015/0364993 A1 Dec. 17, 2015

(51) Int. Cl.
*H02M 3/156* (2006.01)
*H05B 33/08* (2006.01)

(52) U.S. Cl.
CPC ........... *H02M 3/156* (2013.01); *H05B 33/0815* (2013.01)

(58) Field of Classification Search
CPC ........................... H02M 3/156; H05B 33/0815
USPC .............. 315/209 R, 219, 223, 254, 276, 307
See application file for complete search history.

(56) References Cited

U.S. PATENT DOCUMENTS

| | | | |
|---|---|---|---|
| 3,806,829 | A | 4/1974 | Duston et al. |
| 4,008,414 | A | 2/1977 | Agnew |
| 4,562,382 | A | 12/1985 | Elliott |
| 5,040,236 | A | 8/1991 | Costello |
| 5,089,753 | A | 2/1992 | Mattas |
| 5,416,387 | A | 5/1995 | Cuk et al. |
| 5,583,402 | A | 12/1996 | Moisin et al. |

(Continued)

FOREIGN PATENT DOCUMENTS

| | | |
|---|---|---|
| EP | 2590477 A1 | 5/2013 |
| WO | 2011063205 A1 | 5/2011 |

(Continued)

OTHER PUBLICATIONS

International Search Report and Written Opinion, International Patent Application No. PCT/US2013/071690, mailed Jun. 4, 2014, 13 pages.

(Continued)

*Primary Examiner* — Daniel D Chang

(57) ABSTRACT

A low voltage lamp includes a boost converter stage and a load. The load may include low voltage light producing elements including low voltage light emitting diodes. The boost converter stage receives an electronic transformer output and includes an inductor coupled to a switch and a switch controller that receives one or more controller inputs. Inductor current may be returned to the transformer when the switch is closed and provided to a rectifier coupled to the load when the switch is open. Controller inputs may include a transformer input that receives the transformer output, a sense input indicating switch current, and a load input indicating load voltage. Controller logic may synchronize assertions of a control signal for the switch with edge transitions of the transformer output to maintain peak inductor current within a specified range and to selectively transfer stored energy in the inductor to the load or back to the transformer.

35 Claims, 8 Drawing Sheets

(56) References Cited

U.S. PATENT DOCUMENTS

| | | |
|---|---|---|
| 5,650,694 A | 7/1997 | Jayaraman et al. |
| 5,872,429 A | 2/1999 | Xia et al. |
| 6,369,461 B1 | 4/2002 | Jungreis et al. |
| 6,407,935 B1 | 6/2002 | Chang et al. |
| 7,812,550 B2 | 10/2010 | Harmgardt et al. |
| 8,067,902 B2 | 11/2011 | Newman, Jr. et al. |
| 8,212,491 B2 | 7/2012 | Kost et al. |
| 8,547,034 B2 | 10/2013 | Melanson et al. |
| 8,653,759 B2 | 2/2014 | Vigh et al. |
| 8,664,883 B2 | 3/2014 | Hiramatu et al. |
| 8,716,957 B2 | 5/2014 | Melanson et al. |
| 8,723,431 B2 | 5/2014 | Deppe et al. |
| 8,742,674 B2 | 6/2014 | Shteynberg et al. |
| 8,928,243 B2 | 1/2015 | Potter et al. |
| 8,933,648 B1 | 1/2015 | Putman et al. |
| 9,072,125 B2 | 6/2015 | King et al. |
| 2003/0127994 A1 | 7/2003 | Patchornik et al. |
| 2003/0151931 A1 | 8/2003 | Kohno |
| 2005/0174162 A1 | 8/2005 | Cheng et al. |
| 2005/0249667 A1 | 11/2005 | Tuszynski et al. |
| 2006/0147371 A1 | 7/2006 | Tuszynski et al. |
| 2007/0040516 A1 | 2/2007 | Chen |
| 2007/0076459 A1 | 4/2007 | Limpkin |
| 2007/0262654 A1 | 11/2007 | Mosebrook et al. |
| 2007/0285028 A1 | 12/2007 | Tsinker et al. |
| 2008/0013343 A1 | 1/2008 | Matthews |
| 2008/0018261 A1 | 1/2008 | Kastner |
| 2008/0024074 A1 | 1/2008 | Mosebrook et al. |
| 2008/0119421 A1 | 5/2008 | Tuszynski et al. |
| 2008/0224636 A1 | 9/2008 | Melanson |
| 2009/0184662 A1 | 7/2009 | Given et al. |
| 2009/0295292 A1 | 12/2009 | Harmgardt et al. |
| 2010/0013409 A1 | 1/2010 | Quek et al. |
| 2010/0141178 A1 | 6/2010 | Negrete et al. |
| 2010/0164406 A1 | 7/2010 | Kost et al. |
| 2010/0225251 A1 | 9/2010 | Maruyama |
| 2010/0244726 A1 | 9/2010 | Melanson |
| 2011/0012530 A1 | 1/2011 | Zheng et al. |
| 2011/0115400 A1 | 5/2011 | Harrison et al. |
| 2011/0121751 A1 | 5/2011 | Harrison et al. |
| 2011/0121752 A1 | 5/2011 | Newman, Jr. et al. |
| 2011/0121754 A1 | 5/2011 | Shteynberg et al. |
| 2011/0127925 A1 | 6/2011 | Huang et al. |
| 2011/0199017 A1 | 8/2011 | Dilger |
| 2011/0210674 A1 | 9/2011 | Melanson |
| 2011/0266968 A1 | 11/2011 | Bordin et al. |
| 2011/0309759 A1 | 12/2011 | Shteynberg et al. |
| 2012/0025729 A1 | 2/2012 | Melanson et al. |
| 2012/0043913 A1 | 2/2012 | Melanson |
| 2012/0049752 A1 | 3/2012 | King et al. |
| 2012/0098454 A1 | 4/2012 | Grotkowski et al. |
| 2012/0106216 A1 | 5/2012 | Tzinker et al. |
| 2012/0112638 A1 | 5/2012 | Melanson et al. |
| 2012/0112648 A1 | 5/2012 | Hariharan |
| 2012/0119669 A1 | 5/2012 | Melanson et al. |
| 2012/0139431 A1 | 6/2012 | Thompson |
| 2012/0146546 A1 | 6/2012 | Hu et al. |
| 2012/0169240 A1 | 7/2012 | Macfarlane |
| 2012/0229041 A1 | 9/2012 | Saes et al. |
| 2012/0230073 A1 | 9/2012 | Newman et al. |
| 2012/0242238 A1 | 9/2012 | Chen et al. |
| 2012/0286684 A1 | 11/2012 | Melanson et al. |
| 2012/0286696 A1 | 11/2012 | Ghanem |
| 2012/0286826 A1 | 11/2012 | King et al. |
| 2012/0299501 A1 | 11/2012 | Kost et al. |
| 2013/0002163 A1 | 1/2013 | He et al. |
| 2013/0113458 A1 | 5/2013 | Riesebosch |
| 2013/0278159 A1 | 10/2013 | Del Carmen, Jr. et al. |
| 2014/0009078 A1 | 1/2014 | Xie et al. |
| 2014/0009079 A1 | 1/2014 | Xie et al. |
| 2014/0009082 A1* | 1/2014 | King .............. H05B 37/02 315/247 |
| 2014/0028214 A1* | 1/2014 | Mazumdar ......... H05B 33/0815 315/279 |
| 2014/0167639 A1 | 6/2014 | King et al. |
| 2014/0167652 A1 | 6/2014 | King et al. |
| 2014/0239832 A1 | 8/2014 | Shteynberg et al. |
| 2014/0333205 A1 | 11/2014 | Kost et al. |
| 2015/0061536 A1 | 3/2015 | Xie et al. |

FOREIGN PATENT DOCUMENTS

| | | |
|---|---|---|
| WO | 2011111005 A1 | 9/2011 |
| WO | 2013090904 A1 | 6/2013 |

OTHER PUBLICATIONS

International Search Report and Written Opinion, International Patent Application No. PCT/US2013/047777, mailed Jun. 26, 2014, 21 pages.

International Search Report and Written Opinion, International Patent Application No. PCT/US2013/047844, mailed Jul. 23, 2014, 14 pages.

International Search Report and Written Opinion, International Patent Application No. PCT/US2014/032182, mailed Jul. 24, 2014, 10 pages.

International Search Report and Written Opinion, International Patent Application No. PCT/US2014/037864, mailed Sep. 29, 2014, 8 pages.

* cited by examiner

BOOST CONVERTER STAGE SWITCH CONTROLLER

FIELD-OF DISCLOSURE

The present disclosure relates in general to the field of low voltage lighting, and more specifically to systems and methods for providing power to a low voltage lamp with an electronic transformer.

BACKGROUND

FIG. 1 illustrates a prior art low voltage lighting system 10 including a main supply 12 providing a main supply signal 14 representing, for example, the voltage 15 across output terminals 16, to a dimmer 20, which is an optional component that may be replaced with a simple switch. In the low voltage lighting system 10 illustrated in FIG. 1, dimmer 20 generates a dimmer signal 24 representing, for example, the voltage 25 across dimmer output 26, that has a lower average power than main supply signal 14. Dimmer 20 may, for example, cut the phase of main supply signal 14. The dimmer signal 24 is provided to an electronic transformer 30. The electronic transformer 30 converts dimmer signal 24 to a transformer output signal 34 representing, for example, the voltage 35 across transformer output 36 that provides a supply signal for a low voltage lamp 40, which draws a lamp current 42 from electronic transformer 30. Low voltage lamp 40 may be a halogen lamp, a light emitting diode (LED) lamp, or another type of lamp that operates on a low voltage supply, i.e., a supply producing a supply voltage of 12 $V_{RMS}$ (root mean squared) or less.

The electronic transformer 30 may include self-oscillating circuitry that requires a minimum current, referred to as the oscillating current, to self-sustain reliable oscillation. If the lamp current 42 is less than the oscillating current specified for electronic transformer 30, electronic transformer 30 may fail to operate reliably and low voltage lamp 40 may flicker or fail to illuminate.

The lamp current of halogen lamps is typically greater than the oscillating current specified for electronic transformer 30. LED lamps, however, are generally more efficient and have lower power ratings than halogen lamps of comparable luminosity. While higher efficiency and lower power consumption are generally desirable, the lamp current 42 associated with an LED lamp may be lower than the oscillation current specified for the electronic transformer 30.

SUMMARY

In accordance with the teachings of the present disclosure, disadvantages and problems associated with ensuring reliable electronic transformer operation with LED lamps may be reduced or eliminated.

In accordance with embodiments of the present disclosure, a low voltage lamp suitable for use with a low voltage electronic transformer comprises a boost converter stage coupled to a load that may include one or more LEDs or other low voltage light produced components. In at least one embodiment, the boost converter stage includes an inductor, a switch, and a switch controller that turns the switch on and off.

In at least some embodiments, the inductor receives the output of the electronic transformer and provides an inductor current to a rectifier that provides a rectified current to a switch node. The switch may be configured to determine whether the rectified current is routed to the load or returned to the electronic transformer. For example, the switch may be configured wherein the rectified current is provided to the load when the switch is off and returned to the electronic transformer when the switch is on. Persons of ordinary skill in the field of low voltage lighting will appreciate that embodiments disclosed herein, in which the inductor receives an unrectified signal from the electronic transformer, are distinguishable from at least some low voltage lamps designed for use with electronic transformers including conventional MR16-compliant LED lamps, in which a rectifier rectifies the transformer output and provides a rectified signal to the inductor.

The switch controller may be configured to turn on the switch by asserting a switch control signal that the switch controller provides to a control terminal of the switch. The switch controller may also be configured to synchronize assertions of the switch control signal with the transformer output. For example, the switch controller may be configured to control the interval of time between edge transitions of the transformer output and assertions of the switch control signal. In addition, the switch controller may receive a set of one or more inputs from the boost converter stage and control the switch control signal in further accordance with any one or more these inputs.

In embodiments compatible for use with magnetic transformers as well as electronic transformers, portions of the boost converter stage may be selectively connected only when the transformer providing power to the LED lamp is an electronic transformer. In these embodiments, the LED lamp may include electronic transformer detection circuitry configured to activate the boost converter circuit in response to detecting that the transformer providing power to the LED lamp is an electronic transformer. The electronic transformer detection circuitry may include, as an example, a high pass filter that triggers a switch configured to include or exclude the inductor from a power stage of the LED lamp that receives the transformer output. The high pass filter may be configured to differentiate between an electronic transformer output and a magnetic transformer output based on high frequency components characteristic of electronic transformer outputs. Suitable electronic transformer detection circuitry may include elements of electronic transformer detection circuits disclosed in U.S. provisional patent application No. 61/822,673, filed May 13, 2013, which is incorporated by reference herein in its entirety. Because the detailed description that follows emphasizes the use of the boost converter circuit synchronized with the transformer output to facilitate stable and reliable operation of a self-oscillating circuit in an electronic transformer, transformers depicted and disclosed below may be described as or assumed to be electronic transformers. Nevertheless, whenever a transformer herein is described as or assumed to be an electronic transformer, compatibility with magnetic transformers may be achieved by the inclusion of an electronic transformer detection circuit to selectively activate the boost converter for operation with electronic transformers.

Returning now to the boost converter circuit, the boost converter circuit may include an inductor coupled to a switch and may be configured to operate in either a real power transfer mode or a reactive power transfer mode. When operating in the reactive power transfer mode, energy may be transferred back and forth between the electronic transformer and the inductor. The inductor current associated with reactive power transfer contributes to the total current drawn by the LED lamp from the electronic transformer. In this manner, a low voltage LED lamp including a boost power circuit and a controller as disclosed herein beneficially satisfies the oscillating current requirement of the electronic transformer without sacrificing the higher efficiency of the LED lamp and without introducing dimmer compatibility issues.

In accordance with these and other embodiments of the present disclosure, a low voltage boost converter stage of a low voltage lamp may include an inductor, a switch, and a switch controller configured to receive one or more controller inputs. The controller inputs may include, as examples, a transformer input, a sense input, and a load input. The transformer input may be coupled to or otherwise configured to receive the output of an electronic transformer. The sense input may be configured to receive a sense signal that indicates the current flowing through the switch, which may indicate the inductor current. The load input may be configured to receive a LOAD signal indicative of a load voltage.

The switch controller may include controller logic configured to generate or control a switch control signal based, at least in part, on one or more of the controller inputs. The switch control signal may be coupled to a control input of the switch to close and open the switch or otherwise control a conductive state of the switch. The switch, when closed, may provide a current path for at least a portion of the inductor current. Current traversing the current path provided by the switch when closed may represent reactive transfer of energy between the inductor and the electronic transformer.

In at least some embodiments, the controller logic is configured to synchronize at least some transitions of the switch control signal, i.e., closings and openings of the switch, with edge transitions of the transformer output in accordance with threshold values, predetermined or otherwise, of an inductor current parameter. For example, a negative to positive transition of the transformer output may represent the end of an inductor charging period and the controller logic may be configured to close the switch long enough before the end of the charging period to ensure that the inductor current at the end of the charging period, which corresponds to the minimum peak inductor current, is greater than or equal to the minimum peak inductor current specified for the electronic transformer. The timing of the closing of the switch may be influenced by factors including the specified minimum peak inductor current, the inductance of the inductor, and the amplitude and oscillation frequency of the transformer output. The synchronization of the switch control signal and the transformer output facilitates stable and reliable oscillation of the electronic transformer by ensuring compliance with a minimum peak inductor current requirement of the electronic transformer.

In some embodiments, assertions of the switch control signal are further controlled to ensure that the minimum peak inductor current does not exceed a maximum threshold specified for the inductor. For example, the controller logic may be configured to delay the closing of switch sufficiently to ensure that the inductor current at the end of the charging period is less than or equal to maximum inductor current specified for the inductor. The amount of delay may be determined by factors including the maximum inductor current, the inductance of the inductor, the amplitude of the transformer output and the oscillation frequency of the transformer.

The controller logic may be configured to de-assert the switch control signal or to otherwise turn off the switch during an inductor discharging period, e.g., the period following a positive-to-negative transition of the transformer output, in accordance with a triggering value of the LOAD signal. In these embodiments, a real transfer of energy stored in the inductor occurs when the switch is turned off as the inductor energy is dissipated in the load. A change of the triggering value may result in more or less energy being transferred from the inductor to the load.

Embodiments of the controller logic thus offer the ability to operate the switch exclusively or primarily in the reactive transfer mode when the load requires a current that is small relative to the oscillation current required by the electronic transformer and thereby motivate better electronic transformer performance by increasing the current drawn from the electronic transformer without substantially increasing power dissipated in the load. Similarly, the controller logic may operate the switch to produce more real transfer of energy from the inductor to the load when the load requires a current that is closer to or exceeds the oscillation current. In this mode of operation, the switching of the inductor again promotes increased current drawn from the transformer and the corresponding improvement in electronic transformer performance, but uses the energy stored in the inductor to provide real power required by the load. The controller logic may support a single pulse mode of operation in which the controller logic turns the switch on once per half-cycle or half-period of the transformer output. The controller logic may also support a multi-pulse mode in which the controller logic cycles the switch off and on multiple times during a transformer output half-period. In the multi-pulse mode, the controller logic may close the switch early in the charging period and then, as the inductor current approaches a specified high value, e.g., a value between the minimum peak inductor current and the maximum inductor current, the controller logic may turn the switch off. When the switch is off, energy stored in the inductor is dissipated in the load and the inductor current falls. When the inductor current drops below a specified low value, the controller logic may turn the switch back on, causing the inductor current to begin rising again. This sequence may be repeated for the duration of the charging period. The multi-pulse mode beneficially enables the controller logic to ensure compliance with minimum peak inductor current and maximum inductor current parameters while utilizing energy stored in the inductor to satisfy energy requirements of the load.

The switch controller may implement or otherwise operate as a finite state machine that defines a set of states that controller logic may assume and criteria for transitioning from one state to another. The finite state machine may include a single pulse finite state machine, a multi-pulse finite state machine, or both.

In at least one embodiment, the single pulse finite state machine may include a set of three states. The controller logic may initiate to an ON state in which the switch is closed. In at least some embodiments, the controller logic may transition from the ON state to an EDGE state when an oscillation signal and an edge signal are both TRUE. The oscillation signal may indicate when the electronic transformer is oscillating properly. The edge signal may indicate an edge transition of the transformer output, e.g., a relatively rapid transition from a first voltage to a second voltage or vice versa including a transition from a positive voltage to a negative voltage of the same or similar amplitude and vice versa or a transition from a positive voltage to a zero voltage or vice versa.

When in the EDGE state, the single pulse finite state machine may keep the switch closed and monitor a COMP_LO signal indicative of whether a value of the sense signal is less than a low threshold value. The single pulse finite state machine may transition from the EDGE state to an OFF state upon detecting that the COMP_LO signal is FALSE, i.e., the sense signal is less than the low threshold value.

When transitioning to the OFF state, the single pulse finite state machine may open the switch or otherwise turn the switch off and monitor an OFF counter that indicates how long the finite state machine has been in the current OFF state.

When the value of the OFF counter reaches or exceeds a threshold value, the finite state machine may transition to the ON state and turn the switch on. In these embodiments, the threshold value of the OFF counter determines how long the switch is kept open following the beginning of a transformer output half-period, which may be used to control the minimum peak inductor current that the inductor experiences. Lower values of the threshold will result in the switch being closed earlier in a transformer output half-period and will increase the minimum peak inductor current while higher values of the threshold will result in the switch being closed later in a transformer output half-period and will decrease the minimum peak inductor current.

Embodiments of the switch controller that support multi-pulse operation may execute a finite state machine that includes finite state machine states different than or in addition to the finite state machine states of the single pulse finite state machine. In at least one embodiment, the multi-pulse finite state machine may include an ON state, similar to the single pulse finite state machine, in which the switch is closed, and the controller logic is configured to respond to detecting the oscillation signal and a COMP_HI signal both asserted, by de-asserting the switch control signal, transitioning to a CCM_OFF state, and monitoring a CCM_OFF counter indicative of a duration of the CCM_OFF state. The controller logic may be further configured to respond, while in the CCM_OFF state, to detecting the CCM_OFF counter exceeding a CCM_OFF threshold by asserting the switch control signal, transitioning to a CCM_ON state.

In the CCM_ON state, the controller logic may monitor the COMP_HI signal, a CCM_ON counter, and the COMP_LO signal. If the COMP_HI signal is TRUE, the controller logic may transition back to the CCM_OFF state, open the switch, and monitor the CCM_OFF counter as before. If, before the COMP_HI signal is asserted, the controller logic detects the CCM_ON counter exceeding a CCM_ON threshold as well as the COMP_LO signal being FALSE, the controller logic may open the switch and transition from the CCM_ON state to the OFF state.

In the OFF state, the controller logic may be configured to monitor an OFF counter and respond to detecting the OFF counter exceeding an OFF threshold by turning the switch on and transitioning back to the ON state.

When in the ON state, if the controller logic detects the oscillation signal and the edge signal both asserted before the COMP_HI signal is asserted, the controller logic may close the switch and transition to an EDGE state. The controller logic may remain in the EDGE state until the COMP_LO signal is TRUE, at which point the controller logic may transition to the OFF state.

In accordance with embodiments disclosed herein, a low voltage apparatus including, without limitation a low voltage lighting apparatus, may include a boost converter stage configured to receive a transformer output signal and provide a load current to a load. The boost converter stage may include an inductor coupled to an input port configured to receive the transformer output signal, a switch coupled to the inductor, and a controller. The controller may include controller inputs, including, without limitation, a transformer input configured to receive a transformer output from a transformer, a sense input configured to receive a sense signal indicative of current in the switch, and a load input configured to receive a LOAD signal indicative of a load voltage, and controller logic configured to generate a switch control signal based, at least in part, on the controller inputs. The switch control signal may be configured to control the state of the switch. The apparatus may further include a low voltage light emitting diode lamp.

The controller logic may be configured to assert the switch control signal in accordance with a minimum threshold for the inductor current.

In accordance with still other embodiments disclosed herein, a switch control method may include receiving controller inputs, including receiving a transformer output from a transformer, receiving a sense signal indicative of current in a switch, and receiving a LOAD signal indicative of a load voltage. The method may include generating a switch control signal based, at least in part, on the controller inputs, wherein the switch control signal is configured to control the state of the switch and wherein the switch influences a current path of inductor current associated with an inductor coupled to the transformer output.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED-DESCRIPTION

Figure 2:
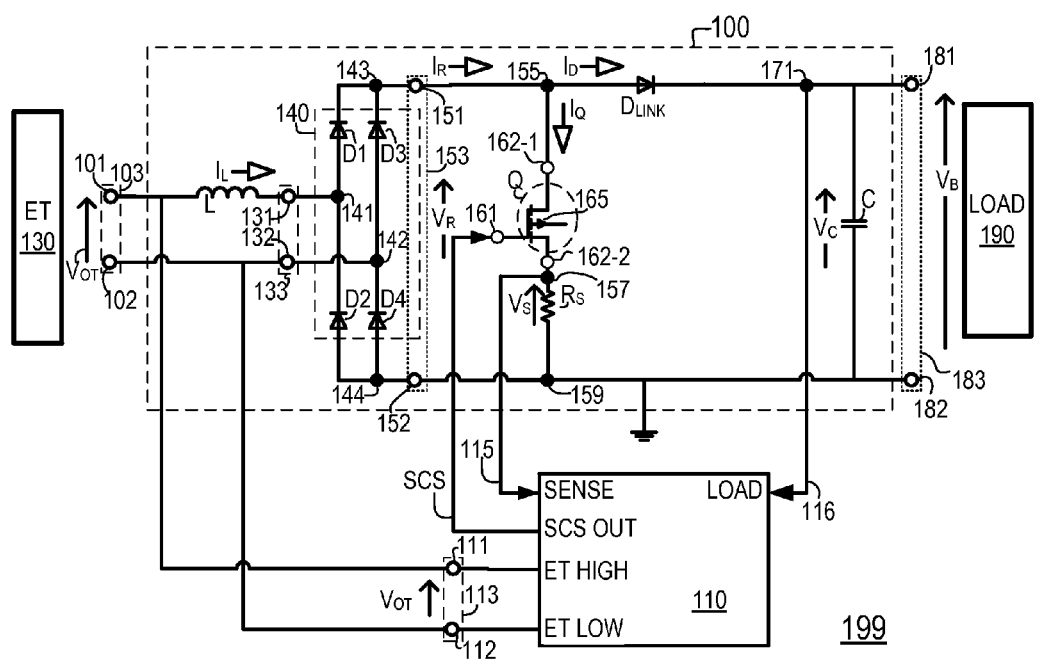
FIG. 2 illustrates a boost converter stage of a low voltage lamp including a switch controller to operate a switch associated with an inductor.

FIG. 2 illustrates selected elements of a low voltage lamp 199 including a boost converter stage 100 coupled to a switch controller 110 and a load 190. Load 190 may include one or more low voltage light producing components including one or more low voltage light emitting diodes. The illustrated boost converter stage 100 includes an inductor L that receives the output of electronic transformer 130 and provides an inductor current $I_L$ to a rectifier 140. Rectifier 140 provides a rectified current $I_R$ to a switch node 155. The rectified current $I_R$ is generally positive and approximately equal in magnitude to the inductor current $I_L$. The switch node 155 is connected to the switch Q and is also connected to the load 190 via a linking circuit that includes a linking diode $D_{LINK}$ and a linking capacitor C. Linking capacitor C is connected across an output 181 of boost convert stage 100. Boost converter stage output 181 is provided to the load 190.

The switch controller 110 illustrated in FIG. 2 generates a switch control signal SCS that operates switch Q based on the output of electronic transformer 130 and one or more inputs from boost converter stage 100. When switch Q is open, the switch current $I_Q$ flowing through switch Q is negligible and substantially all of the rectified current $I_R$ flows through the link diode $D_{LINK}$ as the link diode current $I_D$. When switch Q is closed, substantially all of the rectified current $I_R$ flows back to electronic transformer 130 through switch Q, i.e., $I_R$ is substantially equal to $I_Q$ and $I_D$ is zero or negligible. Thus, when the switch Q is closed, the switch current $I_Q$ represents current drawn from electronic transformer 130 that is not dissipated in load 190 and does not, therefore, increase power consumption. In addition, when switch Q is closed and the transformer output voltage $V_{OT}$ is positive and relatively constant, the inductor current $I_L$ increases approximately linearly. The switch controller 110 may assert the switch control signal SCS for a duration sufficient to ensure that the inductor current $I_L$ reaches a minimum peak value required to maintain stable operation of electronic transformer 130, but not so long that the inductor current $I_L$ exceeds a maximum inductor current specified for the inductor.

The boost converter stage 100 illustrated in FIG. 2 includes an input 103 including a first terminal 101 and a second terminal 102. Input 103 is configured to receive transformer output voltage $V_{OT}$ from electronic transformer 130. An input 113 of a switch controller 110 is connected in parallel with input 103 such that switch controller 110 receives the transformer output voltage $V_{OT}$ from electronic transformer 130. An inductor L is connected between first terminal 101 of input 103 and a first terminal 131 of a rectifier input 133 of a rectifier 140. Second terminal 102 of input 103 is connected to a second terminal 132 of rectifier input 133.

The rectifier 140 illustrated in FIG. 2 is a diode bridge rectifier that includes input nodes 141 and 142, diodes D1, D2, D3, and D4, and output nodes 143 and 144. As illustrated in FIG. 2, the cathodes of diodes D1 and D3 are connected to first output node 143 and the anodes of diodes D2 and D4 are connected to second output node 144. First input node 141 is connected to the D1 anode and the D2 cathode and second input node 142 is connected to the D3 anode and to the D4 cathode. As illustrated in FIG. 2, first output node 143 is connected to a first terminal 151 of rectifier output 153. Second output node 144 is connected to a second terminal 152 of rectifier output 153. Although the rectifier 140 illustrated in FIG. 2 is a diode bridge rectifier, rectifier 140 may be implemented in other suitable configurations.

First terminal 151 of rectifier output 153 is connected to a switch node 155 and second terminal 152 of rectifier output 153 is connected to ground node 159. Rectifier 140 provides a rectified current IR to switch node 155. Switch node 155 is connected to an anode of a diode referred to herein as link diode $D_{LINK}$ and to a first output terminal 162-1 of switch Q.

The switch Q illustrated in FIG. 2 is a solid state transistor 165, which may be implemented as either a bipolar transistor or a field effect transistor. A second output terminal 162-2 of switch Q is connected to a sense node 157. Switch Q as illustrated in FIG. 2 further includes an input terminal 161 that receives switch control signal SCS from switch controller 110. Controller 110 receives a sense signal 115 from sense node 157. Sense node 157 is connected to a first terminal of a sense transistor $R_S$. A second terminal of sense resistor $R_S$ is connected to ground node 159.

When the switch controller 110 illustrated in FIG. 2 asserts switch control signal SCS to close, activate, turn on or otherwise place switch Q in a low impedance OR conductive state, a short circuit or a virtual short circuit is created between switch node 155 and sense node 157 and the rectified current $I_R$ may flow readily through switch Q between first output terminal 162-1 and second output terminal 162-2. Conversely, when switch controller 110 de-asserts switch control signal SCS, switch Q is opened, deactivated, turned off, or otherwise placed in a high impedance state, an open circuit or a virtual open circuit is established between switch node 155 and sense node 157 and the rectified current $I_R$ is prevented or substantially prevented from flowing between first output terminal 162-1 and second output terminal 162-2.

In some embodiments, the cathode of link diode $D_{LINK}$ is connected to output node 171. Output node 171 connects to a first terminal 181 of a boost converter stage output 183. Output node 171 also provides LOAD signal 116 to a LOAD input of switch controller 110. A link capacitor C is shown connected between output node 171 and ground node 159, to which a second terminal 182 of boost converter stage output 183 is also connected. In this embodiment, the link capacitor voltage, $V_C$, equals the boost converter stage output voltage, $V_B$, that drives load 190.

Switch Q is shown with its output terminals 162-1 and 162-2 connected in series with a sense resistor $R_S$. The switch current $I_Q$ flowing from switch node 155 through switch Q when switch Q is closed is substantially equal to the rectifier current $I_R$. When the switch Q is open, switch current $I_Q$ is negligible and the rectified current $I_R$ flows through link diode $D_{LINK}$ as the diode current $I_D$. If switch Q is then closed, the voltage at switch node 155 will jump as the inductor current $I_L$, the rectified current $I_R$, and the diode current $I_D$ all increase rapidly. The rapid increase in the diode current $I_D$ will cause the link capacitor voltage $V_C$ to rise above the steady state voltage and, in this manner, the boost converter output voltage, $V_B$, is boosted with respect to the amplitude of the rectified output 153. If the switch Q is opened and closed periodically, the magnitude of boost converter stage output voltage $V_B$ will be greater than the amplitude of the rectifier output voltage $V_R$.

The sense voltage $V_S$ at sense node 157 when switch Q is closed is a function of the inductor current $I_L$ and the sense resistance $R_S$. For example, using a 1Ω sense resistor $R_S$, the sense voltage $V_S$ in millivolts (mV) closely approximates the magnitude of inductor current $I_L$ in milliamps (mA). The boost converter stage illustrated in FIG. 2 provides the sense voltage $V_S$ to switch controller 110 as the sense signal 115.

From a qualitative perspective, switch controller 110, in conjunction with switch Q and inductor L, is suitable for connecting a low voltage LED lamp to an electronic transformer. By controlling switch Q, switch controller 110 can control the inductor current $I_L$ to ensure compliance with the minimum peak inductor current required by the electronic transformer without violating a maximum inductor current limit. For example, switch controller 110 may monitor the inductor current $I_L$ via sense signal 157 and, based on the inductor current sensed, switch controller 110 may open switch Q when the inductor current $I_L$ reaches a specified or desired value. The ability to sense inductor current $I_L$ directly reduces concerns with the size of the inductor, the magnitude of the transformer voltage, and other various parameters that contribute to the inductor current and the rate of change of instructor current.

Figure 3:
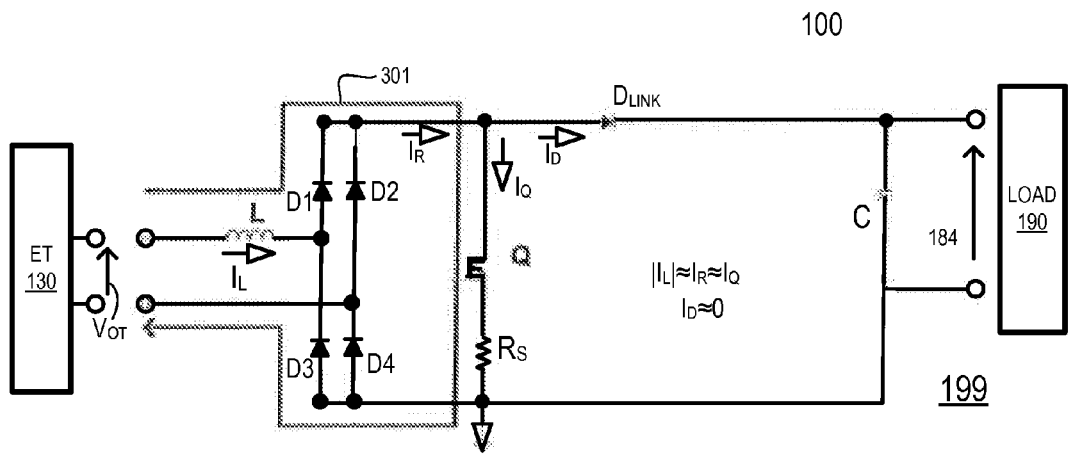
FIG. 3 illustrates the FIG. 2 boost converter stage operating in a reactive power transfer mode.

FIG. 3 illustrates boost converter stage 100 operating in a reactive power transfer mode when switch Q is on. As FIG. 3 illustrates, inductor current $I_L$ follows current path 301 from the electronic transformer 130, through diode D1, switch Q, and diode D4 when $I_L$ is positive and through diode D3, switch Q, and diode D2 when negative, depending on the polarity of the transformer output voltage $V_{OT}$. In this mode of operation, electronic transformer 130 and inductor L exchange energy reactively. The inductor current $I_L$ associated with the reactive power transfer mode of FIG. 3 and the current path 301 emphasize the ability to sustain the oscillation current required by electronic transformer 130 with no or little real power consumption.

Figure 4:
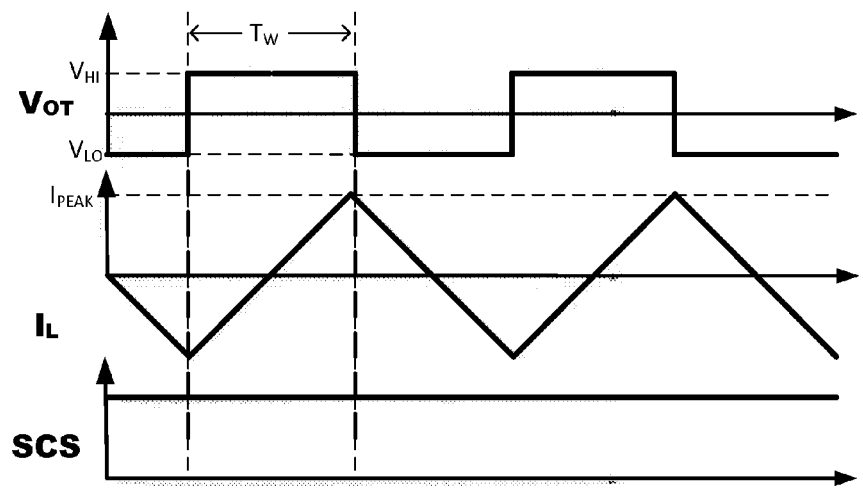
FIG. 4 includes first example waveforms illustrating reactive power transfer mode operation.

FIG. 4 illustrates example waveforms of the transformer output voltage $V_{OT}$, the inductor current $I_L$, and switch control signal SCS, operating in a reactive power transfer mode, with the switch control signal SCS always on. The transformer output voltage VOT is illustrated oscillating between a positive voltage $V_{HI}$ and a negative voltage $V_{LO}$ at a frequency of $(2*T_W)^{-1}$, where $T_W$ is the half period of $V_{OT}$. For a constant value of transformer output voltage $V_{OT}$, the voltage across inductor L when the switch Q is closed is substantially constant and the inductor current $I_L$ increases approximately linearly when the transformer output voltage $V_{OT}$ is positive and decreases approximately linearly when the transformer output signal is negative in accordance with the current-voltage relationship for an inductor having an inductance L, $V_L = L*dI_L/dt$, where $V_L$ is the voltage across the inductor. For sufficiently small values of $R_S$, $V_L$ is approximately equal to $V_{OT}$ when the switch Q is closed and the rate at which the inductor current $I_L$ increases is approximately $V_{OT}/L$. In the FIG. 4 example, assuming $V_{HI}$ and $V_{LO}$ have the same magnitude, the peak inductor current $I_{PEAK}$ is a linear function of $V_{HI}$, L, and $T_W$ and, more specifically, $I_{PEAK}=(V_{HI}*T_W)/2L$.

Figure 5:
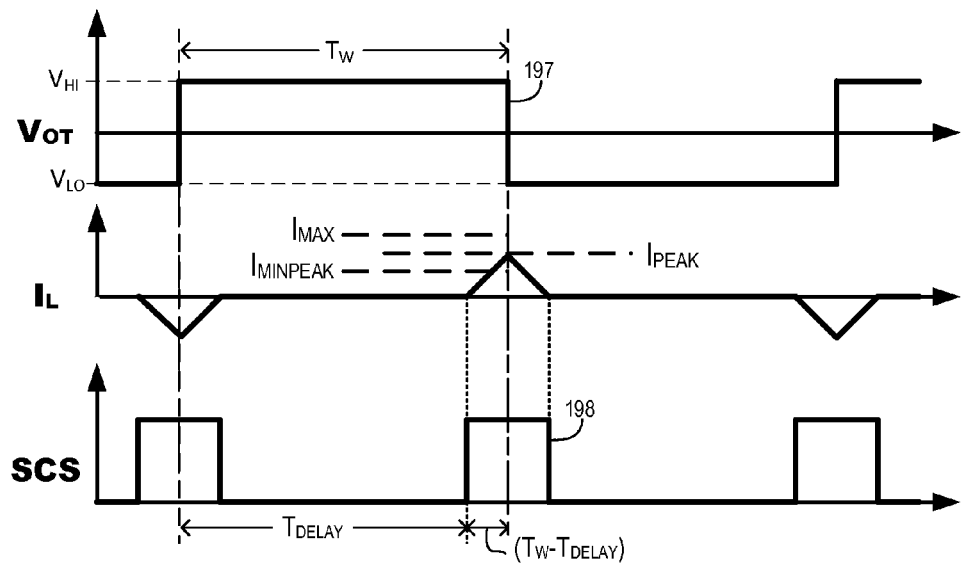
FIG. 5 includes second example waveforms illustrating reactive power transfer mode operation.

FIG. 5 depicts an example of the reactive power transfer mode emphasizing the use of switch control signal SCS to control the peak value $I_{PEAK}$ of the inductor current $I_L$ independent of the duration of the transformer output voltage half-period $T_W$. As illustrated in FIG. 5, for example, assertion of switch control signal SCS is delayed for an interval $T_{DELAY}$ after the edge transition of transformer output voltage $V_{OT}$ so that the peak inductor current $I_{PEAK}=V_{HI}(T_W-T_{DELAY})/2L$, may be controlled by switch controller 110 for given values of L, \$T_{HI}$, and $T_W$. FIG. 5 illustrates a value of $T_{DELAY}$ that results in a peak inductor current $I_{PEAK}$ that is greater than the minimum peak inductor current $I_{MINPEAK}$ required by electronic transformer 130 and less than the maximum inductor current $I_{MAX}$ specified for the inductor L.

The timing diagram of FIG. 5 also illustrates the inductor current $I_L$ decreasing from the peak value $I_{PEAK}$ to zero beginning at $V_{OT}$ edge 197, when the polarity of the transformer output voltage $V_{OT}$ transitions from positive ($V_{HI}$) to negative ($V_{LO}$). The switch control signal SCS illustrated in FIG. 5 is de-asserted, at SCS edge 198, just as the inductor current $I_L$ reaches zero. Because the switch control signal SCS illustrated in FIG. 5 remains asserted until there is no energy stored in inductor L, i.e., until $I_L$ reaches 0, all transfer of energy in FIG. 5 is reactive energy transfer.

Figure 6:
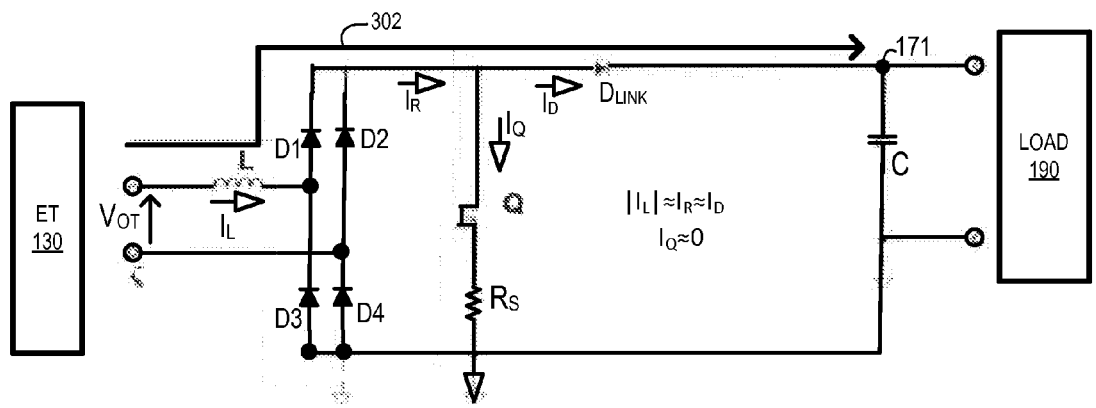
FIG. 6 illustrates the FIG. 2 boost converter stage operating in a real power transfer mode.

FIG. 6 illustrates boost converter stage 100 operating in a real power transfer mode when the switch Q is open. As illustrated, inductor current $I_L$ follows current path 302 from inductor L, through rectifier diode D1, when $I_L$ is positive, and link diode $D_{LINK}$, to output node 171. In this mode of operation, energy stored in the inductor L charges the link capacitor C, is dissipated in load 190, or both.

Figure 7:
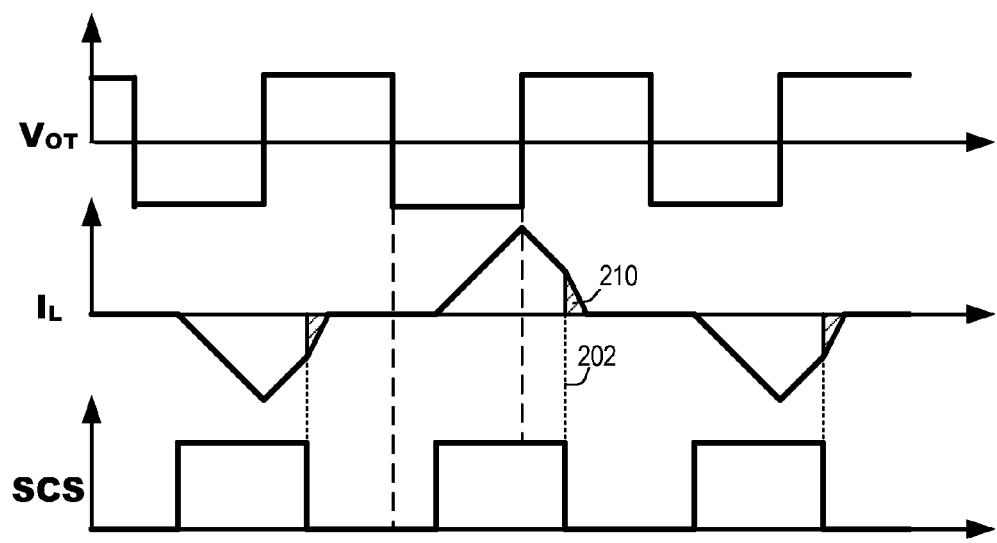
FIG. 7 includes example waveforms illustrating single pulse operation of the controller with transfer of real energy from the inductor and to the load.

FIG. 7 illustrates waveform examples similar to FIG. 5. In the FIG. 7 waveforms, however, the switch control signal SCS is de-asserted at 202 before all of the stored energy in the inductor L is returned to the electronic transformer, i.e., before the magnitude of the inductor current $I_L$ returns to zero. With the timing illustrated in FIG. 7, the energy 210 that is stored in inductor L when the switch Q is opened is transferred to the load 190 (of FIG. 6). By varying the amount of time following the edge transition of transformer output voltage $V_{OT}$ that switch control signal SCS is de-asserted, switch controller 110 can control the amount of energy stored in inductor L that is transferred to the load.

Figure 8:
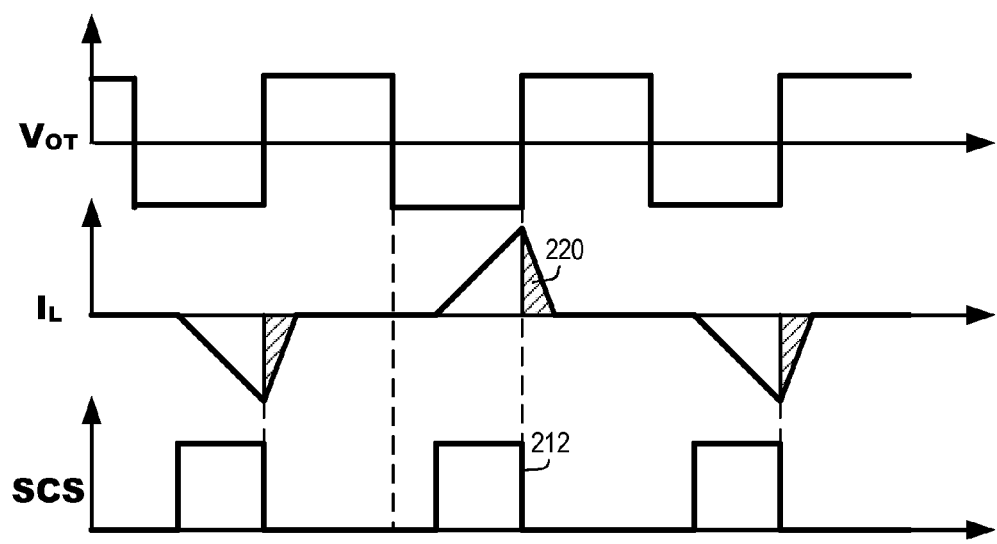
FIG. 8 includes a second example of waveforms illustrating single pulse operation of the controller with transfer of real energy from the inductor and to the load.

FIG. 8 illustrates waveforms similar to FIG. 7 except that de-assertion of the SCS signal at 212 in FIG. 8 occurs substantially at the same time as the end of cycle transition of the transformer output voltage $V_{OT}$. In this example, the inductor current $I_L$ when the switch is opened is greater than the inductor current $I_L$ when the switch was opened in FIG. 7 and, as a result, the real power transfer that occurs in FIG. 8, represented by the reference numeral 220, is greater than the real power transfer of FIG. 7, represented by reference numeral 210.

The timing configurations illustrated in FIG. 4, FIG. 5, FIG. 7, and FIG. 8, are all single pulse configurations in which the switch control signal SCS is asserted only once per half-period of transformer output voltage $V_{OT}$.

Figure 9:
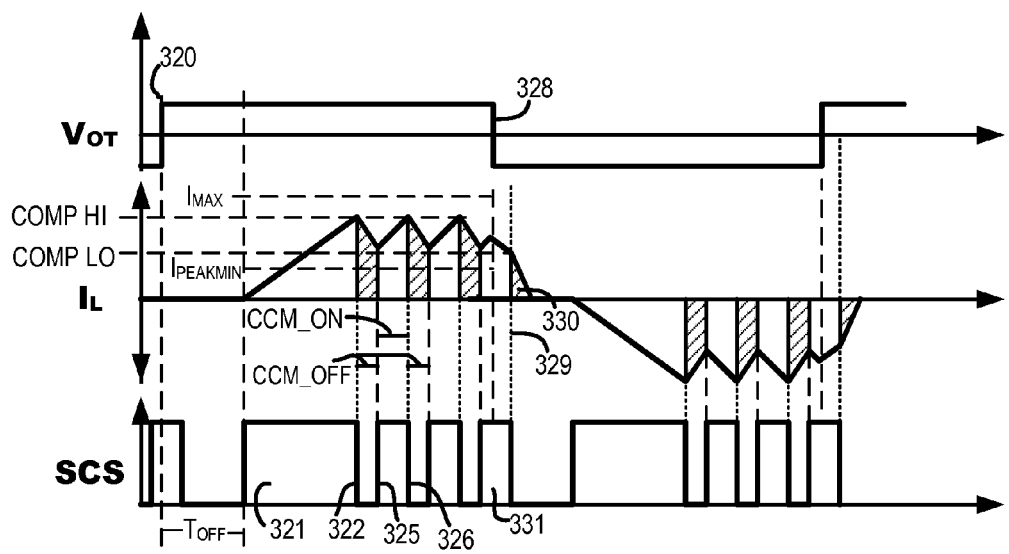
FIG. 9 includes example waveforms illustrating multi pulse operation of the controller.

FIG. 9 illustrates a multi-pulse timing configuration in which switch control signal SCS is asserted two or more times within a single half-period of transformer output voltage $V_{OT}$. During a first assertion 321 of switch control signal SCS, which begins at time $T_{DELAY}$ relative to the $V_{OT}$ rising edge 320, the inductor current increases from zero to a specified value, identified in FIG. 9 as the COMP_HI value, at time 322, well before the end of the transformer output signal half-period. Switch Q is then turned off, by de-asserting switch control signal SCS at 322, for an interval labeled as the CCM_OFF interval, during which energy stored in the inductor L is partially transferred to the load. FIG. 9 illustrates switch control signal SCS being re-asserted as switch Q is turned back on when $I_L$ reaches a COMP_LO value at 325 and inductor current $I_L$ begins to increase during an interval labeled as CCM_ON. When the inductor current again reaches the COMP_HI value at reference 326, switch Q is again turned off to begin a second CCM_OFF interval. This sequence of CCM_OFF intervals followed by CCM_ON intervals may continue through the end of the transformer output signal half-period at time 328.

In the example illustrated in FIG. 9, the switch control signal SCS is in an asserted state at the end of the transformer output signal half-period and remains asserted for an interval following the end of the half-period, until SCS is de-asserted at time 329 and the energy 330 remaining in inductor L is transferred to the load. Embodiments of switch controller 110 may open the switch Q at 329 based upon satisfaction of one or more criteria. For example, the de-assertion of the SCS signal at 329 may occur when $I_L$ drops below COMP_LO and the width of the last assertion 331 of the switch control signal SCS is greater than a minimum CCM_ON threshold. In addition, although FIG. 9 illustrates SCS in an asserted state at the end of the transfer output signal half-period, SCS signal may be in a de-asserted state at the end of the transformer output signal half-period.

Qualitatively, the FIG. 9 waveforms illustrate the ability to control the inductor current $I_L$ and utilize energy stored in the inductor by turning on switch Q relatively early in the transformer output signal half-period, monitoring the inductor current until it reaches a COMP_HI value, for example, that is greater than the minimum peak inductor current, but less than the maximum inductor current $I_{MAX}$, and then begin toggling switch Q off and on to transfer a portion of the inductor energy to the load while maintaining the inductor current in a relatively narrow range between the minimum peak inductor current and the maximum inductor current.

Figure 1:
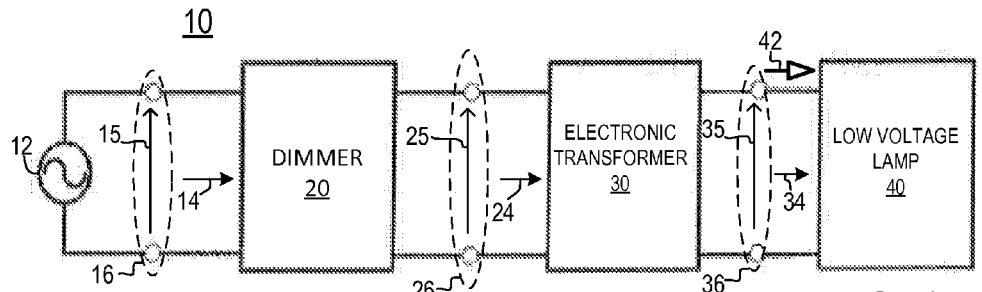
FIG. 1 illustrates a low voltage lighting system, as is known in the art.
Figure 10:
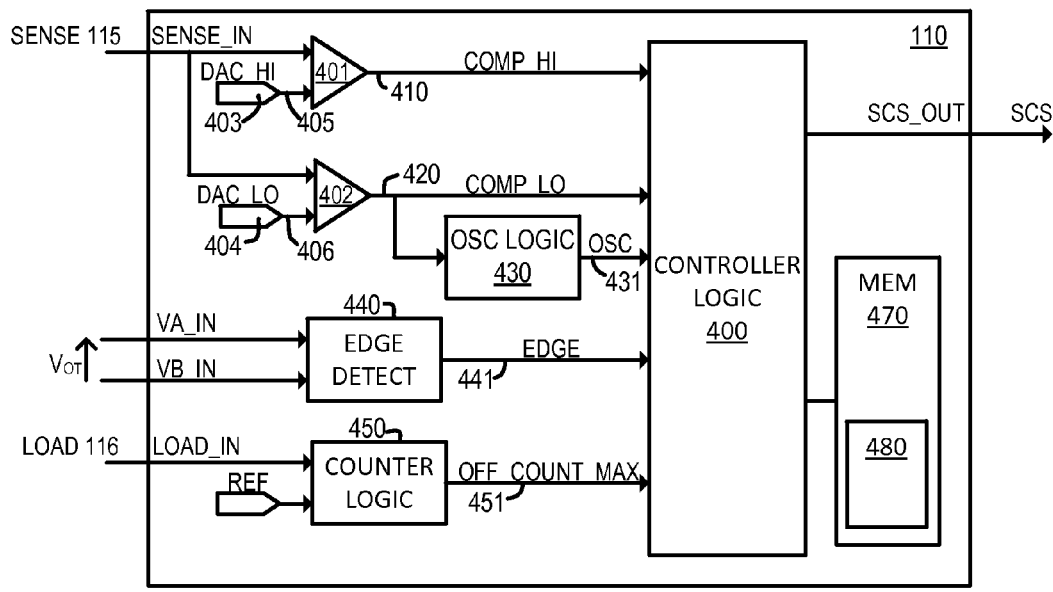
FIG. 10 illustrates example elements of the FIG. 2 switch controller.

FIG. 10 illustrates elements of an example switch controller 110 suitable for use in boost converter stage 100 of FIG. 1. The switch controller 110 illustrated in FIG. 10 receives sense signal 115 at a SENSE_IN input, LOAD signal 116 at a LOAD_IN input, and transformer output voltage $V_{OT}$ via an input pair identified as VA_IN and VB_IN. In at least one embodiment, switch controller 110 derives a set of one or more internal signals from the received inputs. The switch controller 110 illustrated in FIG. 10 includes controller logic 400 that receives the internal signals and generates the switch control signal SCS, which is output on the SCS_OUT output.

In some embodiments, switch controller 110 provides sense signal 115 to a first input of a first comparator 401 and to a first input of a second comparator 402. A second input of first comparator 401 receives a predetermined or configurable DAC_HI signal 405 from a digital to analog converter 403 while a second input of second comparator 402 receives a predetermined or configurable DAC_LO signal 406 from a digital to analog converter 404.

The switch controller 110 illustrated in FIG. 10 generates a COMP_HI signal 410, based on the relative values of sense signal 115 and DAC_HI signal 405. Switch controller 110 also generates a COMP_LO signal 420 based on a comparison of sense signal 115 and DAC_LO signal 406 as determined by comparator 402.

The switch controller 110 illustrated in FIG. 10 provides COMP_LO signal 420 to an oscillation logic 430 that generates an oscillation signal 431. Oscillation signal 431 may indicate an operational status of the electronic transformer 130. For example, oscillation signal 431, by indicating when the inductor current $I_L$ exceeds $I_{MINPEAK}$ or another minimum threshold value, may indicate whether boost converter stage 100 is drawing sufficient current to maintain reliable operation of the electronic transformer. An example implementation of oscillation logic 430 is described in greater detail with respect FIG. 15.

In the embodiment of switch controller 110 depicted in FIG. 10, the transformer output signal $V_{OT}$ is received by EDGE detection logic 440, which generates EDGE signal 441 to indicate transformer output signal transitions, e.g., edges of transformer output voltage $V_{OT}$.

FIG. 10, illustrates LOAD signal 116 provided to a first input of counter logic 450, which receives a reference voltage signal 452 as a second input. Counter logic 450 as illustrated in FIG. 10 generates a counter value, identified as OFF_COUNT_MAX 451 that may be used to time the first assertion of the switch control signal SCS following the beginning of a transformer output voltage half-period. In some embodiments, counter logic 450 generates a larger value of OFF_COUNT_MAX when the LOAD signal 116 indicates less loading. Conversely, counter logic 450 may generate lower values of OFF_COUNT_MAX when LOAD signal 116 indicates relatively more loading.

Controller 110 as illustrated in FIG. 10 includes a memory or storage element 470. Memory 470 may be implemented with any suitable form of computer readable memory or storage including, without limitation, magnetic storage, solid-state storage, nonvolatile storage, volatile storage, and so forth. The memory 470 illustrated in FIG. 10 stores or otherwise includes configuration settings 480. The configuration settings 480 stored in the memory 470 illustrated in FIG. 10 may include, without limitation, a multi-pulse configuration setting enabling or indicating multi-pulse operation, a DAC_HI configuration setting corresponding to DAC_HI reference 403 used to determine the COMP_HI signal, a DAC_LO configuration setting corresponding to DAC_LO reference 404 used to determine the COMP_LO signal, a minimum peak inductor current configuration setting indicating a minimum peak current specified for inductor L, a maximum inductor current $I_{MAX}$ setting corresponding to the maximum current recommended for the inductor L, an inductance configuration setting indicating the inductance of inductor L, and electronic transformer frequency configuration setting, a CCM_ON configuration setting to indicate a CCM_ON interval, and a CCM_OFF setting to indicate a CCM_OFF interval. Other embodiments may employ more configuration settings, fewer configuration settings, and/or different configuration settings from those illustrated in FIG. 10.

The controller logic 400 of FIG. 10 may receive controller logic inputs including, as non-limiting examples, COMP_HI signal 410, COMP_LO signal 420, oscillation signal 431, EDGE signal 441, and OFF_ COUNT_MAX signal 451. The controller logic 400 illustrated in FIG. 10 generates the switch control signal SCS based upon the controller logic inputs received by controller logic 400 and the configuration settings 480. Controller logic 400 may control switch control signal SCS to support any of the timing configurations illustrated in FIG. 4, FIG. 5, FIG. 7, FIG. 8, and FIG. 9 as well as variations of those illustrated configurations.

Figure 11:
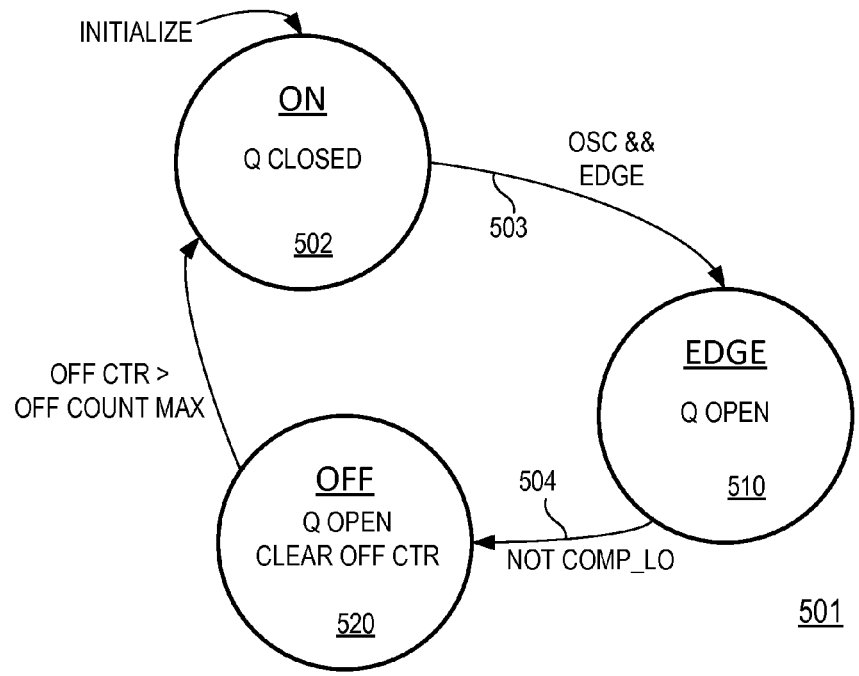
FIG. 11 illustrates a finite state machine supported by the FIG. 2 switch controller in a single pulse mode.

Return referring now to FIG. 11, in at least some embodiments, switch controller 110 implements a finite state machine that includes a defined set of operational states and defined criteria for transitioning between the defined states. FIG. 11 illustrates an example finite state machine 501 supported by switch controller 110 in a single pulse mode. The finite state machine 501 illustrated in FIG. 11 includes an ON state 502, and EDGE state 510, and an OFF state 520. In at least one embodiment, switch controller 110 initiates, e.g., after a power reset, to the ON state 502. In the ON state 502, switch Q is closed and switch controller 110 is monitoring the oscillation signal 431 and the edge signal 441. The finite state machine 501 illustrated in FIG. 11 transitions from ON state 502 to EDGE state 510 along transition path 503 if and when oscillation signal 431 and edge signal 441 are both TRUE. The finite state machine 501 illustrated in FIG. 11 transitions from EDGE state 510 to OFF state 520 along transition path 504 upon detecting COMP_LO signal in a FALSE state, i.e., NOT COMP_LO is true. When finite state machine 501 transitions to OFF state 520, finite state machine 501 turns switch Q off and clears an OFF counter. In at least one embodiment, the OFF counter increments once per cycle of a logic clock signal provided to controller 110 and controller 110 monitors the OFF counter against the OFF_COUNT_MAX setting 451. When the OFF counter exceeds OFF_COUNT_MAX 451, the finite state machine 501 illustrated in FIG. 11 transitions from OFF state 520 to ON state 502.

Figure 12:
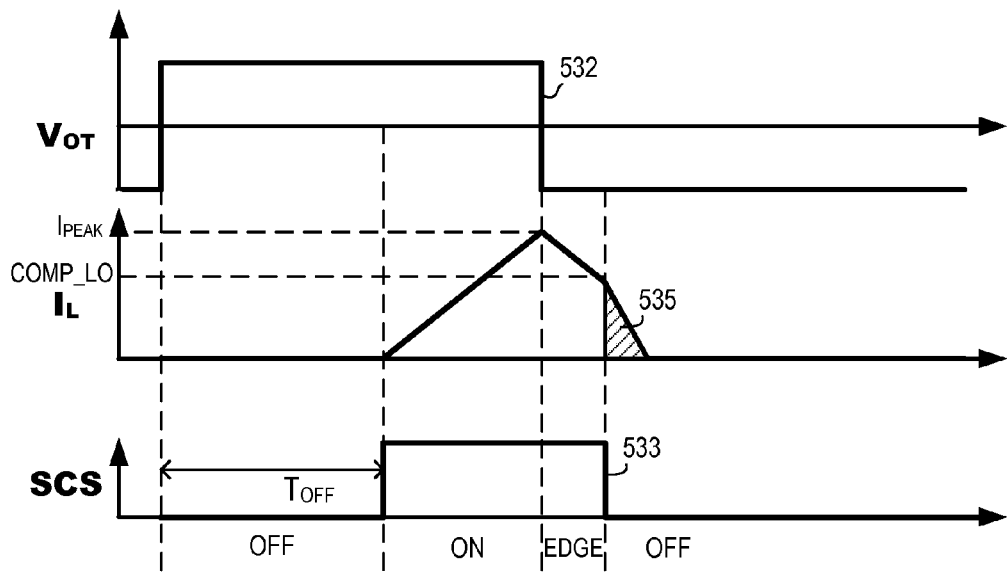
FIG. 12 includes example waveforms illustrating the FIG. 11 operations.

FIG. 12 illustrates example waveforms of transformer output voltage $V_{OT}$, inductor current $I_L$, and switch control signal SCS, for the finite state machine 501 of FIG. 11. As illustrated in FIG. 12, the duration $T_{DELAY}$ of the OFF state represents the amount of time switch control signal SCS remains de-asserted after a lo-to-hi transition of transformer output voltage $V_{OT}$. At the end of the duration $T_{DELAY}$, finite state machine 501 transitions to ON state 502 and switch control signal SCS is asserted and the inductor current $I_L$ begins to rise. The finite state machine 501 illustrated in FIG. 11 and FIG. 12 remains in the ON state 502 with the switch Q closed until the end of the half-period of transformer output voltage $V_{OT}$ at edge 532. In this configuration the peak inductor current is limited only $T_{DELAY}$ 531 and the electrical characteristics of the BOOST converter stage 100.

Following the edge transition 532 of transformer output voltage $V_{OT}$, the EDGE signal 441 is TRUE and switch controller 110 transitions to the EDGE state 510, switch Q remains closed and the inductor current $I_L$ decreases as inductor energy is returned to electronic transformer 130. Finite state machine 501 transitions from EDGE state 510 to OFF state 520 when the inductor current $I_L$ falls below the COMP_LO threshold required to maintain the COMP_LO signal 410 TRUE. Finite state machine 501 de-asserts switch control signal SCS at SCS edge 533 to open the switch Q. When the switch Q is turned off, inductor energy 535 remaining in inductor L is transferred to the load.

Figure 13:
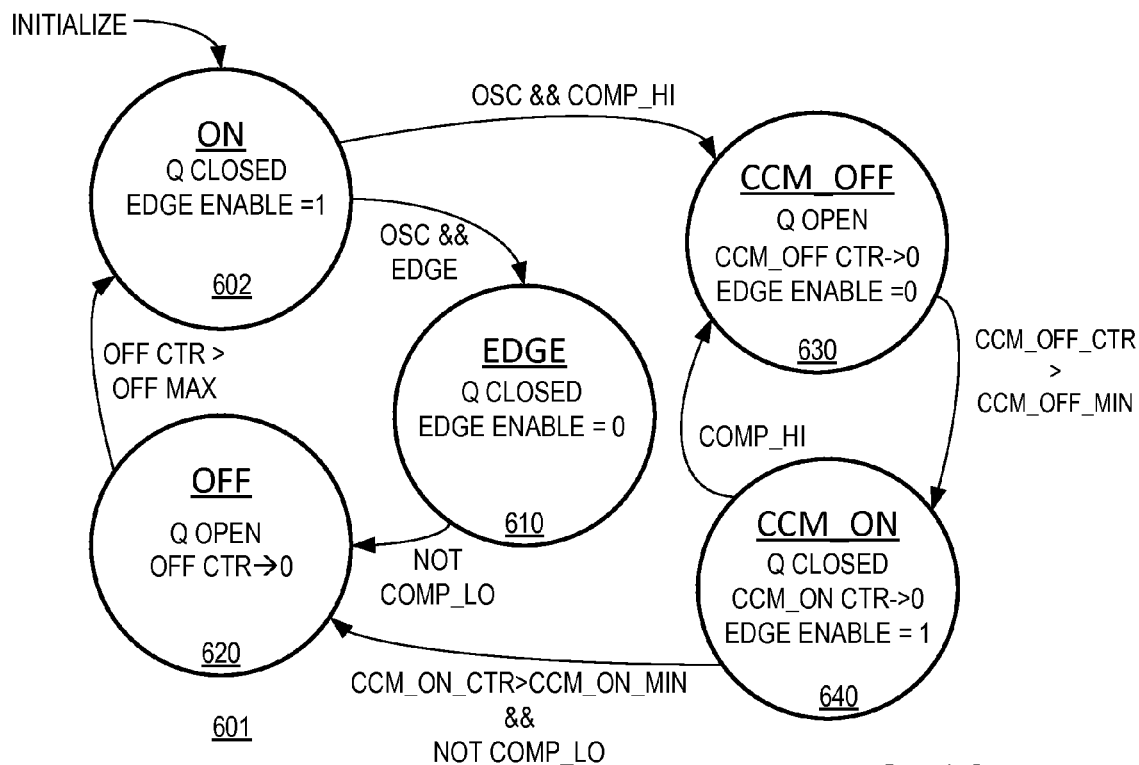
FIG. 13 illustrates a finite state machine supported by the FIG. 2 switch controller in a multi-pulse mode.

FIG. 13 illustrates a finite state machine 601 that supports multi-pulse operation and includes five states. Finite state machine 601 includes an ON state 602, an EDGE state 610, and an OFF state 620 that are analogous to the ON state 502, EDGE state 510, and OFF state 520, illustrated in FIG. 11. However, whereas ON state 502 of finite state machine 501 illustrated in FIG. 11 can transition only to the EDGE state 510, the finite state machine 601 illustrated in FIG. 13 can transition from ON state 602 to two different states. Both transitions from ON state 602 require the detection of the oscillation signal 431. Unlike finite state machine 501, however, finite state machine 601 monitors a COMP_HI signal in addition to the edge signal and the oscillation signal monitored by the finite state machine 501. The finite state machine 601 illustrated in FIG. 13 transitions from ON state 602 to a CCM_OFF state 630 upon detecting the oscillation signal and the COMP_HI signal both asserted. Finite state machine 601 transitions from the ON state 602 to EDGE state 610 upon detecting the oscillation signal and the edge signal both asserted. Recognizing that the COMP_HI signal is associated with an inductor current having a value greater than or equal to a predetermined threshold limit, finite state machine 601 transitions to CCM_OFF state 630 if the inductor current $I_L$ equals or exceeds the COMP_HI threshold before an end of the transformer output half-period.

Figure 14:
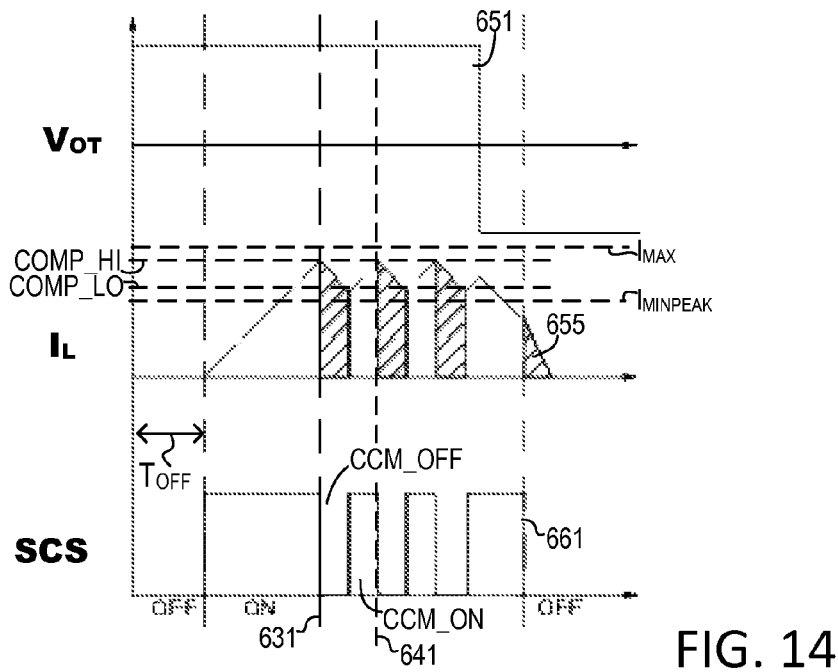
FIG. 14 includes example waveforms illustrating the FIG. 11 operations.

The transition from ON state 602 to CCM_OFF state 630 is illustrated graphically in FIG. 14 at edge transition 631. In the CCM_OFF state 630, switch controller 110 opens switch Q while the transformer output voltage $V_{OT}$ is maintained, in the depicted example, at a positive voltage. With switch Q open, inductor L begins to transfer energy to the load and the inductor current $I_L$ begins to drop. Referring back to FIG. 13, finite state machine 601 monitors a CCM_OFF counter to determine how long switch controller 110 remains in the CCM_OFF state 630. When the CCM_OFF counter equals or exceeds a CCM_OFF threshold, finite state machine 601 transitions from CCM_OFF state 630 to CCM_ON state 640, in which the switch control signal SCS is asserted and a second signal, the edge enable signal, is set to 1.

The finite state machine 601 illustrated in FIG. 13 may transition from CCM_ON state 640 to either the CCM_OFF state 630 or to the OFF state 620. If the COMP_HI signal is asserted while finite state machine 601 is in the CCM_ON state 640, the finite state machine 601 transitions back to CCM_OFF state 630. This transition from CCM_ON state 640 to CCM_OFF state 630 is illustrated graphically at edge transition 641 of FIG. 14. FIG. 14 illustrates that finite state machine 601 may oscillate back-and-forth between CCM_OFF state 630 and CCM_ON state 640 two or more cycles as the inductor current $I_L$ rises and falls between COMP_HI and COMP_LO values while the transformer output voltage $V_{OT}$ remains substantially constant.

The finite state machine 601 illustrated in FIG. 13 may transition from CCM_ON state 640 to the OFF state 620 if and when a CCM_ON counter exceeds a CCM_ON_MIN value and the COMP_LO signal is FALSE. As illustrated in FIG. 14, the transition from CCM_ON state 640 to the OFF state 620 may occur after the transformer output voltage $V_{OT}$ edge 651. When the transformer output voltage $V_{OT}$ transitions at edge 651, $V_{OT}$ changes to a negative value while the switch control signal SCS keeps switch Q closed. Finite state machine 501 begins to transfer reactive energy stored in the inductor L back to the electronic transformer 130 and the inductor current $I_L$ begins to fall. When the switch control signal SCS is then de-asserted at reference 661, switch Q is opened and inductor L transfers its remaining energy 655 to the load.

By controlling the CCM_OFF threshold limit, the CCM_ON threshold limit, and the COMP_HI and COMP_LO signals, finite state machine 601 can implement the state machine transitions illustrated in FIG. 14 flexibly to control the duration of $T_{DELAY}$, and the number and duration of the CCM_ON/CCM_OFF intervals. In the finite state machine 601 illustrated in FIG. 14, the COMP_HI threshold and the COMP_LO threshold are both within the range between the minimum peak inductor current $I_{MINPEAK}$ and the maximum inductor current $I_{MAX}$, with the COMP_HI threshold being greater than the COMP_LO threshold. In this configuration, the switch controller 110 ensures reliable operation of the electronic transformer by satisfying the criteria for oscillation current without violating the maximum current rated for the inductor.

Figure 15:
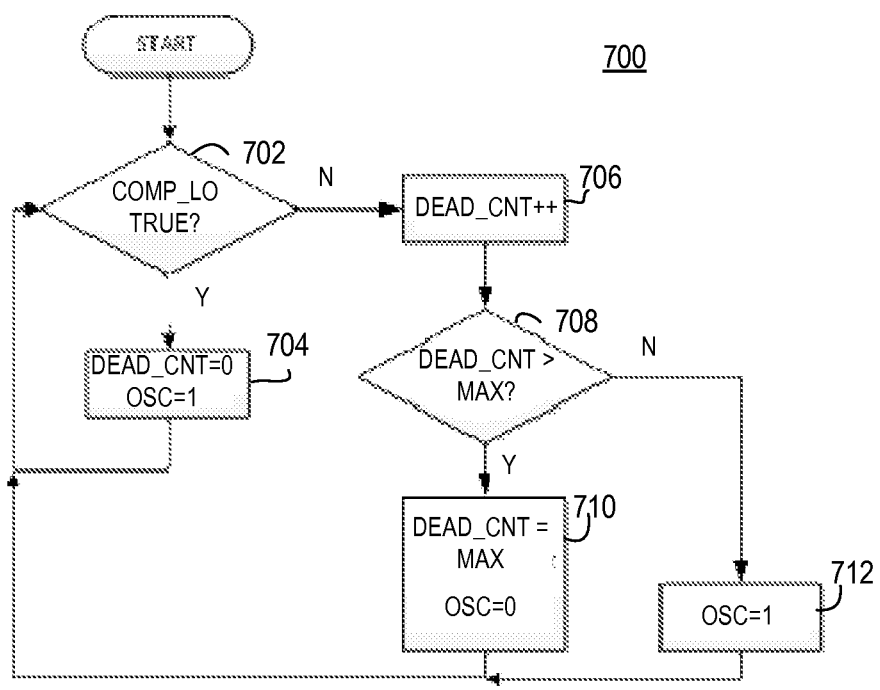
FIG. 15 illustrates operation of oscillation signal logic of the FIG. 2 switch controller.

Finite state machine 601 illustrated in FIG. 13 and FIG. 14 and finite state machine 501 illustrated in FIG. 11 and FIG. 12 both monitor an oscillation signal for, among other things, transition from the initial ON state to some other state. In both of these embodiments, the finite state machine of boost converter stage 100 remains in the initial ON state with the switch control signal asserted until the oscillation signal indicates proper functioning of the electronic transformer circuit. Referring to FIG. 15, a portion of finite state machine 501, finite state machine 601, or another suitable finite state machine, may include oscillation signal logic operable to perform operations according to the flow diagram of FIG. 15. As illustrated in FIG. 15, the operations 700 include an initial comparison (block 702) of the COMP_LO signal. If the COMP_LO signal is true, operation 700 transitions to block 704 where a dead counter is initialized to zero and an oscillation signal is asserted. Method 700 illustrated in FIG. 15 then transitions back to block 702. If the compare low is un-asserted when the comparison of block 702 is made, the method 700 illustrated in FIG. 15 transitions from block 702 to block 706, in which the dead counter is incremented. The method 700 illustrated in FIG. 15 then compares the dead counter with a dead counter maximum at block 708. If the dead counter equals or exceeds the dead counter maximum, method 700 transitions to block 710 where the oscillation signal is de-asserted and the dead counter is set to the dead counter maximum value. If, in block 708, the dead counter is less than the dead counter maximum value, methods 700 sets the oscillation signal to one at block 712 and transitions back to block 702.

As illustrated in FIG. 15, method 700 asserts the oscillation signal initially and maintains the oscillation signal unless the COMP_LO signal remains de-asserted for a duration determined by the dead counter maximum value. If the COMP_LO signal remains de-asserted for longer than the interval determined by the dead counter maximum, the oscillation signal is de-asserted in block 710.

As used herein, when two or more elements are referred to as "coupled" to one another, such term indicates that such two or more elements are in electronic communication whether connected indirectly or directly, without or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A switch controller, comprising:
   a set of one or more controller inputs, including:
      a transformer input configured to receive a transformer signal from an electronic transformer; and
   controller logic configured to:
      detect edge transitions of the transformer signal;
      generate a switch control signal for a switch configured to influence a current path of an inductor current of an inductor coupled to the electronic transformer; and
      synchronize assertions of a switch control signal with the edge transitions.

2. The switch controller of claim 1, wherein the inductor current flows through the switch as switch current and returns to the electronic transformer when the switch is closed.

3. The switch controller of claim 2, wherein the inductor current is rectified and provided to a load when the switch is open.

4. The switch controller of claim 3, wherein, following assertion of the switch control signal, the inductor current increases approximately linearly at a rate determined in accordance with a voltage of the transformer signal and an inductance of the inductor.

5. The switch controller of claim 4, wherein the controller logic is configured to delay assertions of the switch control signal after edge transitions of the transformer signal by delay interval, wherein the delay interval results in a peak inductor current wherein the peak inductor current is greater than a minimum peak inductor current threshold and less than a maximum inductor current threshold.

6. The switch controller of claim 3, wherein:
   the controller inputs include a sense input configured to receive a sense signal indicative of the switch current; and
   the controller logic is configured to control the switch control signal in further accordance with the sense signal.

7. The switch controller of claim 6, wherein:
   the controller inputs include a load input configured to receive a load signal indicative of a load voltage; and
   the controller logic is configured to control the switch control signal in further accordance with the load signal.

8. The switch controller of claim 7, the controller logic is configured to assert the switch control signal once per half-period of the transformer signal.

9. The switch controller of claim 8, wherein the controller logic is configured to assert the switch control signal preceding a positive to negative edge transition of the transformer signal by a minimum interval, wherein the minimum interval is determined in accordance with a minimum peak inductor current threshold.

10. The switch controller of claim 9, wherein the controller logic is configured to assert the switch control signal preceding a positive to negative edge transition by a maximum period, wherein the maximum period is determined in accordance with a maximum inductor current threshold.

11. The switch controller of claim 8, wherein the controller logic is configured to de-assert the switch control signal following a positive to negative edge transition of the transformer signal.

12. The switch controller of claim 11, wherein the controller logic is configured to de-assert the switch control signal following the positive to negative edge transition in accordance with a triggering value of the sense signal.

13. The switch controller of claim 12, wherein the triggering value of the sense signal is indicative of zero inductor current.

14. The switch controller of claim 12, wherein the triggering value of the sense signal corresponds to a positive value of the inductor current and the triggering value is transferred to a load circuit.

15. The switch controller of claim 7, wherein the controller logic is configured to assert and de-assert the switch control signal multiple times per half-period of the transformer signal.

16. The switch controller of claim 15, wherein the controller logic includes a multi-pulse enable input configured to prevent multiple assertions of the switch control signal in a single half-period of the transformer signal until detecting the sense signal above a specified threshold.

17. The switch controller of claim 15, wherein the controller logic is configured to first assert the switch control signal preceding a positive to negative edge transition by a multi-pulse interval, wherein the multi-pulse interval includes a charging interval and a dissipation interval, wherein the charging interval is sufficient to charge the inductor in accordance with a minimum peak inductor current threshold and wherein the dissipation interval is sufficient to encompass a plurality of dissipation cycles.

18. The switch controller of claim 17, wherein each of the dissipation cycles includes a de-assertion of the switch control signal for a first duration and an assertion of the switch control signal for a second duration.

19. The switch controller of claim 17, wherein the controller logic is configured to determine a duration of the multi-pulse interval in accordance with the load signal.

20. The switch controller of claim 7, wherein the controller logic is configured to:
 initialize to an on state with the switch control signal asserted; and
 monitor an oscillation signal indicating the transformer oscillating and an edge signal indicating an edge transition of the transformer signal.

21. The switch controller of claim 20, wherein the controller logic is configured to:
 respond, to detecting the oscillation signal and the edge signal both asserted while in the on state by:
  de-asserting the switch control signal;
  transitioning to an edge state; and
  monitoring a compare low signal indicative of the sense signal below a low threshold.

22. The switch controller of claim 21, wherein the controller logic is configured to:
 respond to detecting the compare low signal asserted while in the edge state by:
  clearing an off counter;
  transitioning to an off state; and
  monitoring an off timeout signal indicative of the off counter exceeding a maximum threshold.

23. The switch controller of claim 22, wherein the controller logic is configured to:
 respond to detecting the off timeout signal while in the off state by:
  asserting the switch control signal; and
  transitioning to the on state.

24. The switch controller of claim 22, wherein the controller logic is configured to:
 respond, while in the off state, to detecting the oscillation signal and a compare high signal both asserted, by:
  de-asserting the switch control signal;
  clearing a continuous current mode off counter;
  transitioning to a continuous current mode off state; and
  monitoring the continuous current mode off counter indicative of a duration of the continuous current mode off state.

25. The switch controller of claim 24, wherein the controller logic is configured to:
 respond, while in the continuous current mode off state, to detecting the continuous current mode off counter exceeding a continuous current mode off threshold by:
  asserting the switch control signal;
  clearing a continuous current mode on counter; and
  transitioning to a continuous current mode on state.

26. The switch controller of claim 25, wherein the controller logic is configured to:
 respond, while in the continuous current mode on state to detecting the compare high signal by:
  de-asserting the switch control signal;
  clearing the continuous current mode off counter; and
  transitioning to the continuous current mode off state; and
 respond, while in the continuous current mode on state, to detecting the continuous current mode on counter exceeding a continuous current mode on threshold and the compare low signal not asserted by:
  de-asserting the switch control signal;
  clearing the off counter; and
  transitioning to the off state.

27. The switch controller of claim 7, wherein the controller logic includes:
 a first comparator configured to generate the compare high signal in accordance with the sense signal and a high reference voltage signal; and
 a second comparator configured to generate the compare low signal in accordance with the sense signal and a low reference voltage signal.

28. The switch controller of claim 27, wherein the controller logic includes:
 an oscillation detector configured to generate the oscillation signal in accordance with the compare low signal, wherein the oscillation signal initializes to a true value and remains true unless the compare low signal is deasserted for a duration exceeding a predetermined interval.

29. A low voltage apparatus suitable for use with an electronic transformer configured to generate a transformer output signal including a transformer output current and a transformer output voltage, the low voltage apparatus comprising:
 a boost converter stage comprising:
  an inductor configured to receive the transformer output current as an inductor current;
  a rectifier configured to generate a rectified current by rectifying the inductor current;
  a switch configured to influence a current path of the rectified current in accordance with a switch control signal; and
 a controller, comprising:
  at least one controller input, including:
   a transformer input configured to receive the transformer output voltage; and
  controller logic configured to synchronize transitions of the switch control signal with transformer output transitions indicated by the transformer input.

30. The apparatus of claim 29, wherein the boost converter stage further includes:
 a capacitor connected across an output of the boost converter stage;
 a diode including an anode connected to the switch node and a cathode connected to a first terminal of the boost converter stage output; and
 wherein the switch includes a first output terminal connected to the switch node and wherein the switch is configured to draw a switch current from the switch node, wherein the switch current is approximately equal to:
  the rectified current when the switch control signal is asserted; and
  zero when the switch control signal is not asserted.

31. The apparatus of claim 30, wherein the controller logic is configured to synchronize the switch control signal with the transformer output transitions wherein a peak inductor current is greater than a minimum peak inductor current threshold and less than a maximum inductor current limit.

32. A switch control method, comprising:
 receiving a set of one or more controller inputs, wherein the controller inputs include a transformer output of an electronic transformer; and
 generating a switch control signal based, at least in part, on the controller inputs, wherein the switch control signal is configured to control a conductive state of a switch configured to influence a current path of a rectified current generated by a rectifier configured to rectify an inductor current of an inductor coupled to the transformer output; and synchronizing assertions of the switch control signal with transitions of the transformer output.

33. The method of claim 32, wherein generating the switch control signal includes:

initializing to an off state with the switch control signal asserted;

monitoring an oscillation signal indicating the transformer oscillating, an edge signal indicating an edge transition of the transformer output, a compare high signal indicating an inductor current in compliance with a maximum inductor current threshold, and a compare low signal indicating an inductor current in compliance with a minimum peak inductor current threshold; and responding, while in the off state, to detecting the oscillation signal and the compare high signal both asserted, by:

de-asserting the switch control signal;

clearing a continuous current mode off counter indicative of a duration of a continuous current mode off state; and transitioning to the continuous current mode off state.

34. The method of claim 33, further comprising:

responding, while in the continuous current mode off state, to detecting the continuous current mode off counter exceeding a continuous current mode off threshold by:

asserting the switch control signal;

clearing a continuous current mode on counter indicative of a duration of a continuous current mode on state; and transitioning to the continuous current mode on state.

35. The apparatus of claim 34, further comprising:

responding, while in the continuous current mode on state to detecting the compare high signal by:

de-asserting the switch control signal;

clearing the continuous current mode off counter; and transitioning to the continuous current mode off state; and responding, while in the continuous current mode on state, to detecting:

the continuous current mode on counter exceeding a continuous current mode off threshold; and the compare low signal not asserted;

by transitioning to the off state.

* * * * *